United States Patent [19]

Sipe et al.

[11] 4,039,310

[45] Aug. 2, 1977

[54] PROCESS OF STRENGTHENING GLASS BOTTLES AND THE LIKE

[75] Inventors: Nelson Eugene Sipe, Denver; Noble Ida, Boulder, both of Colo.

[73] Assignee: Duraglass Research & Development Corporation, Boulder, Colo.

[21] Appl. No.: 648,329

[22] Filed: Jan. 12, 1976

[51] Int. Cl.² .................... C03C 17/28; C03B 39/00
[52] U.S. Cl. .................... 65/25 R; 65/30 R; 65/60 B; 427/133; 427/385 A; 427/407 A
[58] Field of Search .............. 65/60 B, 30 R, 23, 24, 65/26; 427/133, 314, 407 A, 385

[56] References Cited

U.S. PATENT DOCUMENTS

| | | | |
|---|---|---|---|
| 3,387,994 | 6/1968 | Dunton | 65/60 B X |
| 3,495,962 | 2/1970 | Norton et al. | 65/24 X |
| 3,508,894 | 4/1970 | Torok | 65/60 B X |
| 3,876,410 | 4/1975 | Scholes | 65/60 B X |

*Primary Examiner*—Robert L. Lindsay, Jr.
*Attorney, Agent, or Firm*—Bertha L. MacGregor; Kyle W. Rost

[57] ABSTRACT

A method of strengthening glass comprising heating the glass to a temperature between approximately 700° F. and the decomposition temperature of a selected fatty acid, and applying said fatty acid to the surface of the glass. The fatty acid, in regard to the carboxyl group, employed in the disclosed process is not reacted with any other chemical; it is chemisorbed on the surface of the glass for strengthening the microcrack structure on said surface.

18 Claims, No Drawings

PROCESS OF STRENGTHENING GLASS BOTTLES AND THE LIKE

BACKGROUND OF THE INVENTION

1. Field of the invention

The invention relates to glass strengthening methods. More specifically, it relates to chemical treatements of glass for strengthening the microcrack structure on the surface thereof.

2. Description of the prior art

Organic fatty acids are known as an element of various mold lubricants in the glass and metal casting arts. The fatty acid is typically reacted with some other chemical and the fatty acid ester is the common reaction product utilized in the mold lubricant. One such recent disclosure in U.S. Pat. No. 3,495,962 to Norton calls for an olefin oxide derivitive of a fatty acid to serve as an emulsifier in a mold lubricant comprising a mixture of oil and water. No known prior art discloses the use of organic fatty acid not in combination with other chemicals as a treatment for glass, and no known prior art discloses the ability or organic fatty acid to strengthen the surface of glass.

Recent efforts toward increasing the durability of glass containers have called for protective coatings of plastic materials. These coatings increase the durability of the glass by providing a cushion against scratching and impact and help to contain glass fragments if a container should shatter, but no coating is known that actually strengthens the glass surface.

While some containers are coated to increase durability, other containers are being manufactured with thinner walls in order to make them lighter and cheaper in cost. Many of these lighter containers are non-returnable bottles, as their light construction render them unfit for reuse. This approach to container manufacture has the disadvantage of generating waste and often being unfeasable because of state laws requiring beverage bottles to be returnable. Thus, a great need exists for a method of strengthening glass while allowing cost saving through the use of thinner glass container walls.

The present invention is intended to strengthen glass by providing a remedy for those defects in glass structure believed to be responsible for the failure of a glass surface under load. A common concept of the reason for glass failure originated over 40 years ago when Griffith outlined his theory of surface defects existing in materials, especially metals. This theory has been accepted as applying to glass in recent years. The Griffith theory postulates that flaws or microcracks are present in all surfaces and that these microcracks produce high stress concentration when under load. Hence, the method of the present invention attempts to use surface chemistry, and in particular an appropriate surface activating agent such as the organic fatty acids, to alter the surface defect sensitivity of glass by chemisorbing the surface active agent on the surfaces or tips of the microcracks.

SUMMARY OF THE INVENTION

The invention relates to a method of increasing the surface strength of glass by treating the surface with an organic fatty acid at a temperature between approximately 700° F. and 1600° F. (371° C. - 871° C.). The fatty acid is believed to chemisorb on the surface of the glass, thereby forming a surface with increased tensile strength. Furthermore, the strengthening is superior to plastic coatings because the fatty acid has chemically combined with the molecular structure of the glass surface and will not peel away or wash off the glass surface.

An object of the invention is to provide a treatment that is applicable to glass containers already in use to strengthen the containers.

Another object is to strengthen glass by a method that will allow the cross sectional thickness of glass walls to be reduced while retaining the strength of the untreated, thicker wall.

Another important object is to strengthen glass containers so that continued recycle and reuse is possible.

An additional object is to strengthen glass so that it may be used in new and expanded applications where strength has heretofore been a limiting factor.

A further object is to strengthen glass by applying a chemically active sealant that will penetrate and absorb into the surface microcracks existing in virtually all container shapes, such that further microcrack propagation does not occur under load.

Another important object is to strengthen glass of all varieties, without regard to the specific chemical composition of the glass.

DESCRIPTION OF THE PREFERRED EMBODIMENT

Experiments developing the present invention were conducted with a variety of organic fatty acids applied to glass containers at a variety of temperatures. In fabricating the test containers, two furnaces were used. The first was a gas fired softening furnace capable of temperatures to 2500° F. ± 50° variation. The second was an electrically heated annealing furnace capable of temperatures to 1900° F., holding ± 20° variations.

The experimental containers were hand blown spheres because of straightforward analysis of a near spherical shape. Approximate ranges of thicknesses tested range from 0.009 inch wall to 0.150 inch wall and diameter ranges of approximately 1.25 inches to 2.5 inches. The glass composition is basic lime-soda glass, also known as silicon glass, as is commonly found in a variety of beverage bottles:

TABLE 1

Chemical Composition of Lime Glass Used in Fabricating Evaluation Shapes

| | Percent |
|---|---|
| $S_iO_2$ | - 73.0 % |
| $Na_2O$ | - 16.0% |
| $K_2O$ | - 1.4 % |
| CaO | - 5.0 % |
| MgO | - 3.5 % |
| $Fe_2O_3$ | - 0.1 % |

In the laboratory, this composition retained total collapsing temperature of 1292° F. This is approximately the same temperature as the softening point. The annealing range for this composition was 900°-950° F. It is believed that the invention is not dependent on the limited glass formula here used, but is widely applicable to all formulas of glass.

The organic fatty acids used in the experiments are glutamic, stearic and behenic acids, selected for their commercial availability. Experiments were conducted both with the free fatty acids and with the fatty acids combined with an inert carrier. The inert carriers tested included paraffin base waxes such as beeswax.

Testing of experimental results was made by a standard drop test. The experimental glass shapes were dropped from measured heights into a box having a concrete floor 1 inch thick. In this way, a qualitative determination of glass strength could be reliably made. Some representative results of the drop test follow. In all experiments, untreated glass spheres failed at a drop height of 2 feet.

TABLE 2

Strength of Glass as Expressed by Drop Height Showing the Effect of Different Fatty Acids V. Temperature of Application (No Carrier)

| Acid | Temperature (° F.) | Drop Height (Ft.) |
| --- | --- | --- |
| Behenic | 1000 | 11.0 |
| " | 1150 | 10.5 |
| " | 1400 | 8.0 |
| Stearic | 1000 | 9.0 |
| " | 1150 | 8.0 |
| " | 1400 | 6.0 |
| Glutamic | 1000 | 6.25 |
| " | 1150 | 6.0 |
| " | 1400 | 4.5 |

TABLE 3

Strength of Glass as Expressed by Drop Height Showing the Effect of Different Fatty Acids In a Beeswax Carrier V. Temperature of Application

| | Temperature (° F.) | Drop Height (FT.) |
| --- | --- | --- |
| Behenic | 900 | 9.0 |
| " | 1000 | 11.0 |
| " | 1550 | 10.0 |
| Stearic | 900 | 7.0 |
| " | 1000 | 9.0 |
| " | 1550 | 9.0 |
| Glutamic | 900 | 6.0 |
| " | 1000 | 8.0 |
| " | 1550 | 7.0 |

TABLE 4

Combined Effect of Stearic and Behenic Acids in a Beeswax Carrier on the Strength of Glass Expressed By Drop Height V. Temperature of Application

| Temperature (° F.) | Drop Height (FT.) ±½ Ft. |
| --- | --- |
| 900 | 10.5 |
| 1000 | 13.5 |
| 1100 | 15.0 |
| 1200 | 14.0 |
| 1300 | 13.0 |

As suggested by these representative results, the best overall temperature found in the experimental work was approximately 1100° with 1000° to 1300° being the presently preferred temperature range. Some results suggest that a lower temperature closer to 900° may be better. The probable minimum temperature for achieving substantial results is approximately 700° and the maximum is the decomposition temperature of the fatty acid being used, about 1600° for example.

The experimental method of making the treated glass is to heat glass to a molten temperature of 1900° and then blow the desired shape in a mold lined with rubber which has been soaked with the fatty acid. The shape is thus formed and treated at the same time. Other suitable methods include applying the fatty acid to the glass after the shape is formed, by spray for example. Thus, glass containers already manufactured could be strengthened by this method.

The exact chemical reaction responsible for the glass strengthening has not been investigated, but it is believed that the organic fatty acid having the general structure $$CH_3-(CH_2)_n-C{=O \atop -OH}$$

is surface active and chemically reacts with atoms of the glass to form a strengthened surface, thereby strengthening the tips of the microcracks and preventing further crack propagation when the glass is under load. It is further believed that the reactive -OH group reacts with silicon, calcium, or another constituent element of glass to chemically attach the fatty acid molecule to the glass surface. Thus, the coating is able to resist soaking in water and in both acid and alkaline solutions. This chemical combination with surface atoms of the glass is termed chemisorption, and is broadly expected to occur with glass of virtually all formula compositions. The lime-soda glass used for the experimental work is merely a cheap and commonly used form, and therefore an important first example of the utility of the invention.

Any fatty acid is believed to produce the desired strengthening, although with varying success. Behenic acid proved most successful and also is the longest chained of the three acids tested. The probable reason is that the longer chained molecules are more unstable, hence more reactive, and undergo the desired combination with the glass with less applied energy. It is noted that greater drop strengths were achieved with a mixture of fatty acids.

Experiments revealed that treated shapes fractured more readily after repeated drops, suggesting that new microcracks were generated in dropping and these new cracks provided points for crack propagation and eventual failure of the shape. A conventionally applied coating to protect the glass surface, a plastic for example, helped the shapes to retain the effectiveness of the chemisorbed coating, apparantly by preventing the formation of new microcracks.

I claim:

1. A method of strengthening glass against failure under tension, comprising
    a. heating the glass to a temperature between approximately 700° F. and the decomposition temperature of a given fatty acid,
    b. applying said given fatty acid to the surface of the glass, and
    c. slowly cooling the glass said fatty acid being substantially non reacted with any other chemical in regard to the carboxyl group and being cemisorbed on the surface of the glass for strengthening the microcrack structure on said surface.

2. A method of strengthening glass against failure under tension, comprising
    a. heating the glass to a temperature between approximately 700° F. and 1600° F. (371° C. and 871° C.),
    b. applying a fatty acid to the surface of said glass, and
    c. slowly cooling the glass said fatty acid being substantially non reacted with any other chemical in regard to the carboxyl group and being cemisorbed on the surface of the glass for strengthening the microcrack structure on said surface.

3. The method of claim 2, wherein the glass is heated to a temperature between 900° F. and 1300° F.

4. The method of claim 2, wherein the glass is heated to a temperature between 1000° F. and 1300° F.

5. The method of claim 2, wherein the fatty acid is applied in an inert carrier.

6. The method of claim 5, wherein the inert carrier is a paraffin base wax.

7. The method of claim 5, wherein the inert carrier is beeswax.

8. The method of claim 2, wherein the fatty acid is applied to the glass while the glass is being shaped in a mold.

9. The method of claim 8, wherein the fatty acid is first applied to said mold and the glass is then shaped by the fatty acid coated mold.

10. The method of claim 2, wherein the fatty acid is applied by spraying it upon the glass.

11. The method of claim 2, further comprising applying a coating of surface protective material to the fatty acid treated glass.

12. The method of claim 11, wherein the surface protective material is a plastic.

13. The method of claim 2, wherein the fatty acid is behenic acid.

14. The method of claim 2, wherein the fatty acid is stearic acid.

15. The method of claim 2, wherein the fatty acid is glutamic acid.

16. The method of claim 2, wherein a plurality of fatty acids are applied to the surface of the glass in an inert carrier.

17. The method of claim 16, wherein the fatty acids applied are behenic and stearic acids and the inert carrier is beeswax.

18. The method of claim 2, wherein the glass is lime-soda (silicon) glass.

* * * * *